Patented Feb. 20, 1923.

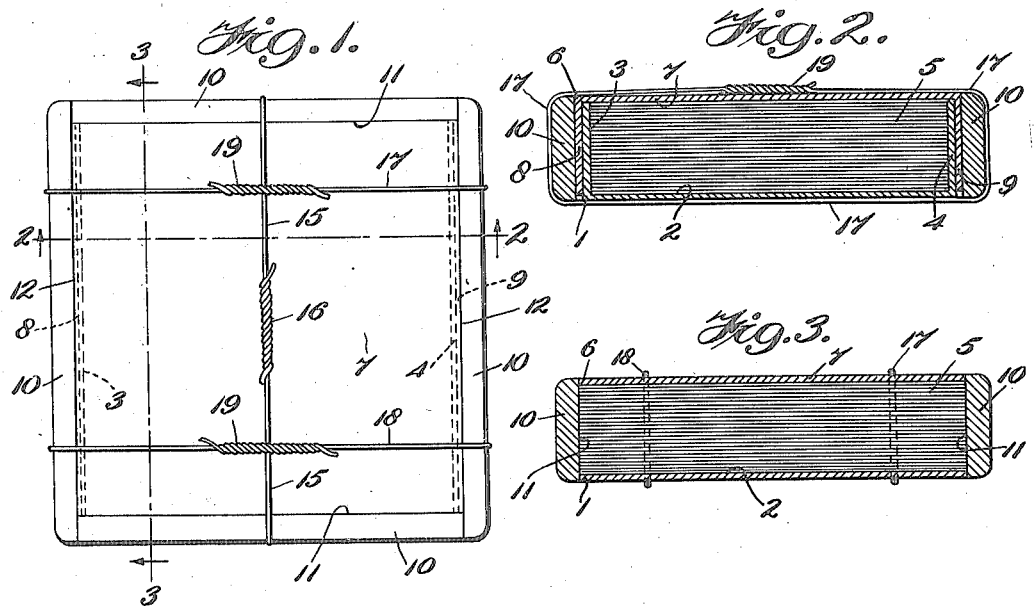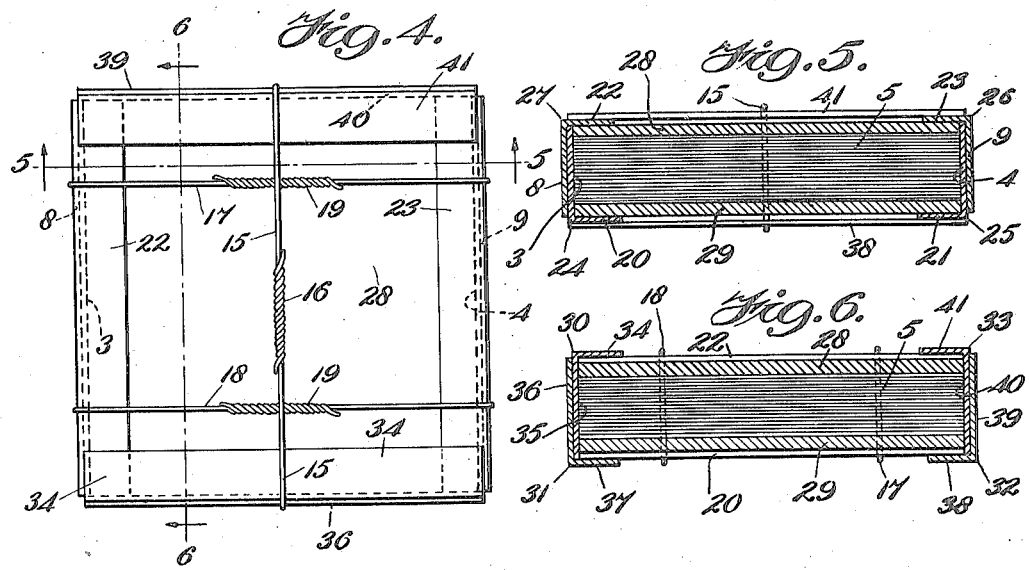

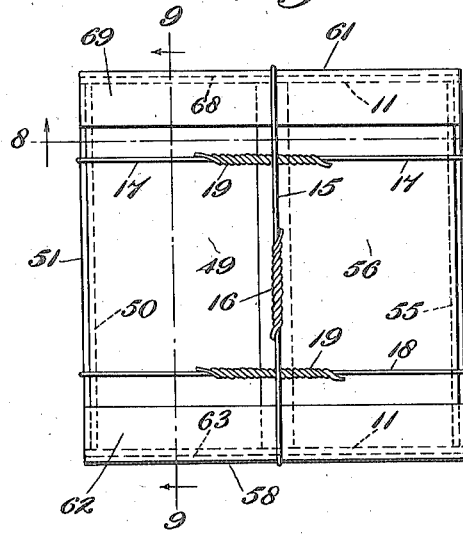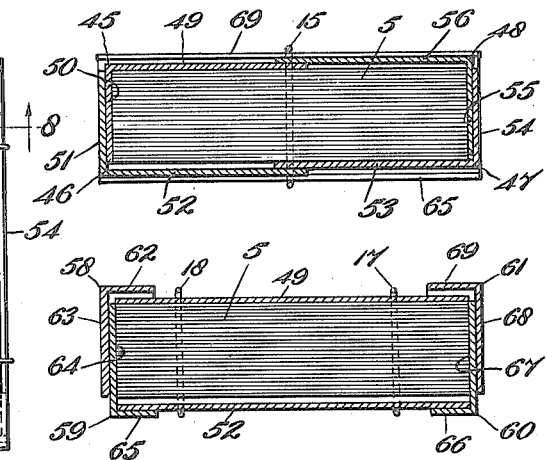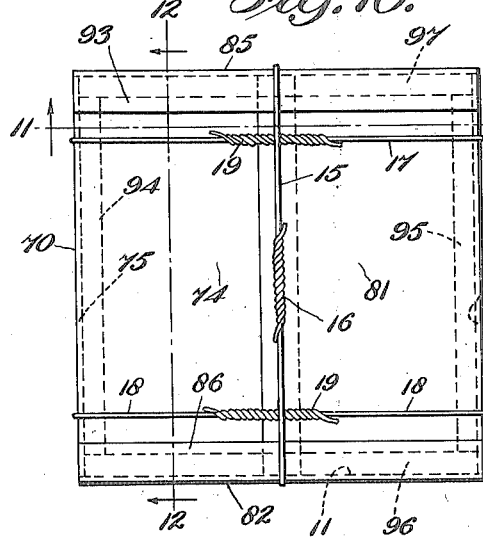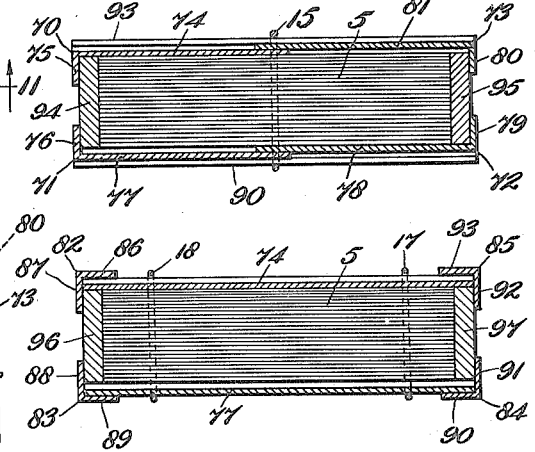

1,445,762

UNITED STATES PATENT OFFICE.

ALEC J. GERRARD AND PARVIN WRIGHT, OF CHICAGO, ILLINOIS.

SHIPPING PACKAGE.

Application filed June 10, 1920. Serial No. 387,828.

*To all whom it may concern:*

Be it known that we, ALEC J. GERRARD and PARVIN WRIGHT, respectively a subject of the King of Great Britain and a citizen of the United States, residing at Chicago, in the county of Cook and State of Illinois, have invented certain new and useful Improvements in Shipping Packages; and we do hereby declare the following to be a full, clear, and exact description of the invention, such as will enable others skilled in the art to which it appertains to make and use the same.

This invention relates to packages of tin plate, especially adapted for shipping, and has for its object to provide a means for encasing and protecting said plate which will be less costly to manufacture and more efficient in use than those heretofore proposed.

With these and other objects in view the invention consists in the novel combinations of parts more fully hereinafter disclosed and particularly pointed out in the claims.

Referring to the accompanying drawings forming a part of this specification, in which line numerals designate like parts in all the views:—

Figure 1 is a plan view of one form of container made in accordance with this invention;

Figure 2 is a sectional view on the line 2—2 of Figure 1, looking in the direction of the arrows;

Figure 3 is a sectional view taken on the line 3—3 of Figure 1 looking in the direction of the arrows;

Figure 4 is a plan view of another form of this invention;

Figure 5 is a sectional view taken on the line 5—5 of Figure 4, looking in the direction of the arrows;

Figure 6 is a sectional view taken on the line 6—6 of Figure 4 looking in the direction of the arrows;

Figure 7 is a plan view of a still further modified form of the invention;

Figure 8 is a sectional view taken on the line 8—8 of Figure 7, looking in the direction of the arrows;

Figure 9 is a sectional view taken on the line 9—9 of Figure 7, looking in the direction of the arrows;

Figure 10 is a plan view of still another form of the invention;

Figure 11 is a sectional view taken on the line 11—11 of Figure 10, looking in the direction of the arrows; and Figure 12 is a sectional view taken on the line 12—12 of Figure 10 looking in the direction of the arrows.

In order that the precise invention may be the more clearly understood it is said: It is well recognized that no satisfactory efficient and inexpensive means or methods have been devised for the shipment of what is known in commerce as packages of "tin plate". These packages, as is also well known, consist of a pile of thin sheet steel, or sheet iron plates piled one on top of another, similar to playing cards in a pack; they constitute a very heavy package; are easily injured during shipment at their corners and edges; and must therefore be furnished with ample protection when in transit either before or after receiving a coating of tin preparatory to being used in commerce for various purposes. Heretofore these "tin plate packs" have been done up in very heavy strong, and comparatively very expensive wooden boxes, or containers, and as above stated, it is the main object of this invention to provide a better and less expensive container than has heretofore been proposed. But from the very nature of the problem, strength is one of the principal requisites, which must be supplied within the limits of cost. This is provided in this invention by wire bands conveniently put on by a special machine to be referred to hereinafter.

In carrying out this invention, as exemplified in Figures 1 to 3, there is provided an open ended trough or pan shaped receptacle 1, having a bottom 2 and side flanges 3 and 4 extending upwardly a distance approximately equal to the thickness of the pack of tin plates 5. Into this open ended pan 1 is placed the pack of plates 5 as shown and a similar but somewhat larger open ended pan 6 having a bottom 7 and side flanges 8 and 9 is inverted to enclose said plates and the flanges of the pan 1 as illustrated. These pan members 1 and 6 are conveniently made from scrap sheet metal or spoiled tin plate material found in abundance around the mill.

The pack of plates 5 having thus been enclosed by the flanges of the open ended pans on two of its edges, a cushioning frame 10 of wood, is next made to encircle the open ends 11 as well as the enclosed sides 12 of the pack, all as will be clear from Figure 1.

A suitable portable wire tying machine such for example as the one disclosed in the U. S. application Sr. No. 381165, filed by A. J. Gerrard on May 13, 1920, and entitled Wire tying and stretching machine, may now be readily applied to the flat top of the very heavy package thus produced, and a wire such as 15 may be passed around said package, put under tension, and while thus tensioned, its ends may be readily and expeditiously twisted together into the knot 16, all as will be clear from said application. In the same way, two additional binding wires 17 and 18 are tied by the knots 19 while under tension in the positions indicated, whereupon there results an unusually strong, light, and comparatively inexpensive enclosure for tin plate, which is dirt and dust proof, and to a certain extent moisture and waterproof, and which answers every requirement of the trade.

In the somewhat modified form of package illustrated in Figures 4, 5 and 6, the construction is substantially the same except the bottoms 2 and 7 of the pans are omitted, thus enabling one to use similar pieces of scrap material.

That is to say, the flanges 3, 4, and 8, 9 of Figure 1 are utilized, but the flange 3 has joined thereto the flange 20, the flange 4 has the flange 21, the flange 8 has the flange 22, and the flange 9 has the flange 23. It thus results that this form of the invention utilizes open ended angle pieces 24, 25, 26, and 27, which fit four corner edges of the pack of plates 5. Between the flanges 22 and 23, there is placed the sheet 28 which may be of wood or other material, and between the flanges 20 and 21 there is placed the protecting sheet 29. Over the other four corner edges of the pack 5 there is placed the four open ended angle pieces 30, 31, 32 and 33, having respectively the pairs of flanges 34 and 35, 36 and 37, 38 and 39, and 40 and 41. Wires 15, 18 and 19 are tied around this package shown in Figure 4, while under tension as in the case of the package shown in Figure 1, and there results a container especially suitable for shipping tin plate in all respects satisfactory to the trade but made from material which is somewhat less expensive than is the case in Figure 1.

The forms of the invention shown in Figures 7, 8 and 9 is similar to that shown in Figure 1, except the bottoms 2 and 7 of the pans are cut as shown, the wooden cushioning member 10 is omitted, and angle members are employed on the edges 11 of the pack 5. In other words, one set of angle members 45, 46, 47 and 48 taking the place of the pans 1 and 6, are respectively provided with the pairs of flanges 49 and 50, 51 and 52, 53 and 54, and 55 and 56 in the overlapped relations illustrated. And another set of angle members 58, 59, 60 and 61 covering the edges 11 of the pack of plates 5 are respectively provided with the pairs of flanges 62 and 63, 64 and 65, 66 and 67, and 68 and 69. In this form of package, scrap material may be used as in the preceding forms.

In the still further modified form of the invention shown in Figures 10, 11 and 12, the set of angle members 70, 71, 72 and 73 take the place of the pans 1 and 6 in Figure 1, and said members are respectively provided with the pairs of flanges 74 and 75, 76 and 77, 78 and 79, and 80 and 81. The other set of angle members 82, 83, 84 and 85 protect the edges 11 of the pack 5, and are respectively provided with the pairs of flanges 86 and 87, 88 and 89, 90 and 91, and 92 and 93. Between the flanges 75 and 76 is the block or strip 94, between the flanges 73 and 79 is the block or strip 95, between the flanges 87 and 88 is the strip 96, and between the flanges 91 and 92 is the strip 97.

It will now be clear that in all the forms, we are enabled to provide a container for packs of tin plate composed of angular bent metal pieces unattached to each other, which cover and protect the edges of the pack 5, and which are held together by metal strands 15, 17 and 19 under tension whose ends 16 are twisted together. It will be further observed that in all the forms the flat top and bottom of the pack are covered by the sheet material either of metal or other substance, and that the four vertical edges of the pack are likewise covered by and protected by metal or other material which is not attached to the other members, and which is likewise firmly held in place by said tie wires. In fact, the pack 5 of tin plates constitutes a core against which the other independent loose covering members made of scrap material are firmly held by the tight tie wires 15, 17, and 18, and without which fitting these said members could not be held together, at all.

What is claimed is:—

1. The herein described package comprising a pack of plates constituting a core of rectangular shape; a plurality of loose angular bent members protecting each side edge of said core; a plurality of additional loose angular bent members protecting each end edge of said core; a plurality of loose plate like members one of which is rigid with each of said first named bent members protecting the top and bottom surfaces of said core; loose material protecting the side and end surfaces of said core; and wires under tension with their ends twisted together firmly binding said members, material and core together, substantially as described.

2. The herein described package comprising a pack of tin plates constituting a core of rectangular form; bent members protecting the side edges of said core; a plurality of additional loose angular bent members protecting the end edges of said core; a plurality of loose plate like members one of which is rigid with a pair of said first named bent members protecting the top and bottom surfaces of said core; loose material comprising four wooden members surrounding and protecting the side and end surfaces of said core; and wires with their ends twisted together firmly binding said members, material and core together, substantially as described.

In testimony whereof we affix our signatures.

ALEC J. GERRARD.
PARVIN WRIGHT.